US006574682B1

(12) United States Patent
Chan

(10) Patent No.: US 6,574,682 B1
(45) Date of Patent: Jun. 3, 2003

(54) DATA FLOW ENHANCEMENT FOR PROCESSOR ARCHITECTURES WITH CACHE

(75) Inventor: Stephen H. Chan, Los Altos Hills, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 09/448,359

(22) Filed: Nov. 23, 1999

(51) Int. Cl.[7] .............................................. G06F 13/00
(52) U.S. Cl. ........................... 710/22; 710/35; 710/52; 711/113; 711/118
(58) Field of Search ........................ 710/22–28, 52–57, 710/33–35; 711/113–132, 135, 137, 149

(56) References Cited

U.S. PATENT DOCUMENTS

| 4,371,929 A | * | 2/1983 | Brann et al. ................... 710/45 |
| 4,723,223 A | * | 2/1988 | Hanada ......................... 710/26 |
| 5,261,072 A | | 11/1993 | Siegel |
| 5,263,142 A | | 11/1993 | Watkins et al. |
| 5,553,307 A | * | 9/1996 | Fujii et al. ..................... 710/25 |
| 5,742,933 A | * | 4/1998 | Kojima et al. ............... 711/113 |
| 5,745,707 A | | 4/1998 | Takahashi |
| 5,822,616 A | * | 10/1998 | Hirooka ........................ 710/22 |
| 5,825,878 A | * | 10/1998 | Takahashi et al. .............. 380/4 |
| 5,933,848 A | * | 8/1999 | Moenne-Loccoz .......... 711/113 |
| 6,128,684 A | * | 10/2000 | Okayama ..................... 710/109 |
| 6,145,026 A | * | 11/2000 | Ziegler ......................... 710/22 |
| 6,219,759 B1 | * | 4/2001 | Kumakiri ..................... 711/137 |
| 6,230,241 B1 | * | 5/2001 | McKenney .................. 711/118 |
| 6,260,126 B1 | * | 7/2001 | Harris ......................... 711/167 |
| 6,338,119 B1 | * | 1/2002 | Anderson et al. ........... 711/135 |
| 6,345,320 B1 | * | 2/2002 | Kawamata et al. ........... 710/22 |
| 6,378,050 B1 | * | 4/2002 | Tsuruta et al. .............. 711/149 |

* cited by examiner

Primary Examiner—Christopher B. Shin
(74) Attorney, Agent, or Firm—Parsons Hsue & de Runtz LLP

(57) ABSTRACT

The present invention provides for data flow enhancement in processor architectures having one or more caches by allowing DMA-type transfers to and from these caches. Specific examples allow such direct transfers between a peripheral logic device and the cache memory, or between either the main memory or a special memory and the cache memory. This is done by the processor reserving a portion of cache for the direct transfer, which is then carried out by a DMA-type controller. While this transfer is occurring, the processor is able to carry out other tasks and access the unreserved portion of cache in the normal manner. In the preferred embodiment, the transfer is performed by a cycle stealing technique. Once the transfer is complete, the reserved portion of the cache may be accessed by the processor. The size of the reservable portion may either be fixed or dynamically determined by the operating system based on factors such as task flow management and data transfer rates. In a preferred embodiment, the operating system works in concert with the cache organized into cache lines, assigning each cache line an address tag field, with particular values of the address tag indicating that a given cache line is part of the reserved portion of the cache.

39 Claims, 8 Drawing Sheets

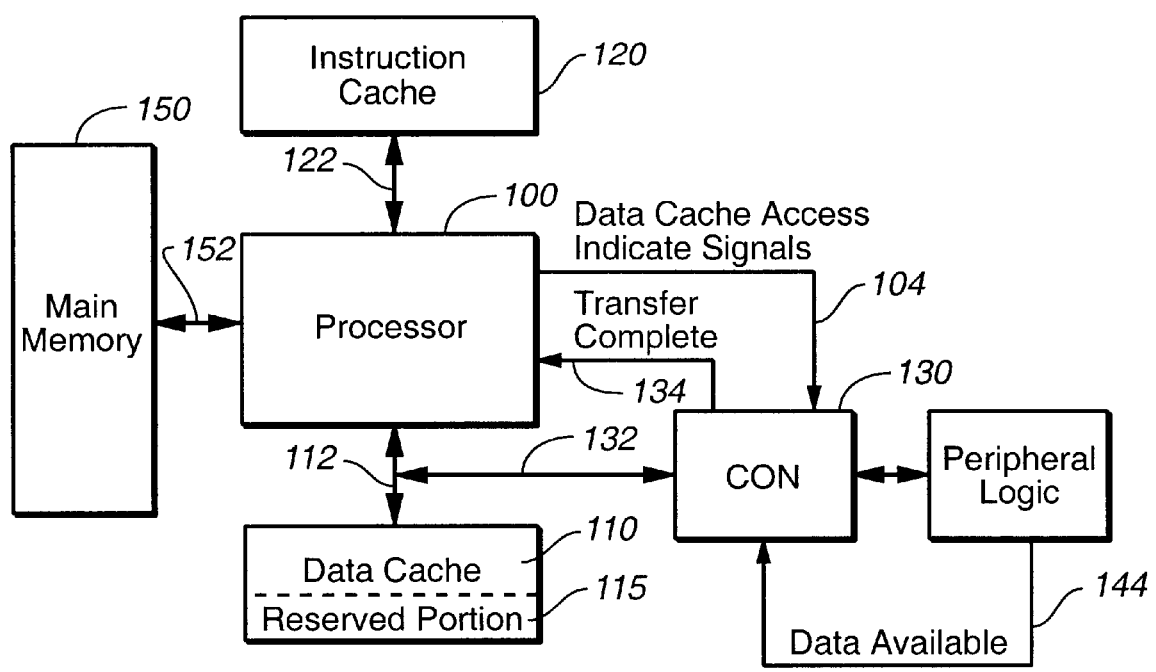
FIG. _1

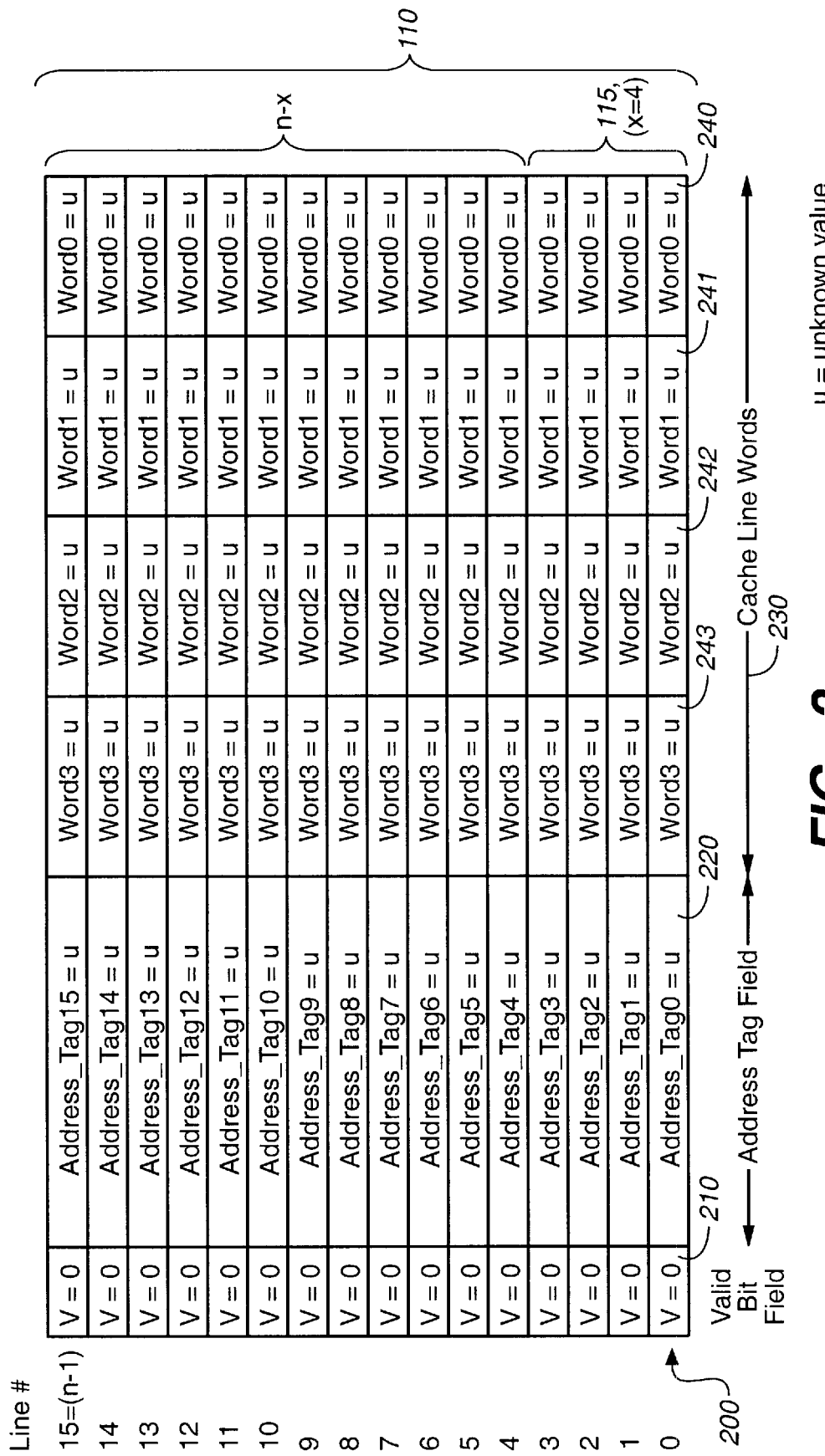
FIG._2

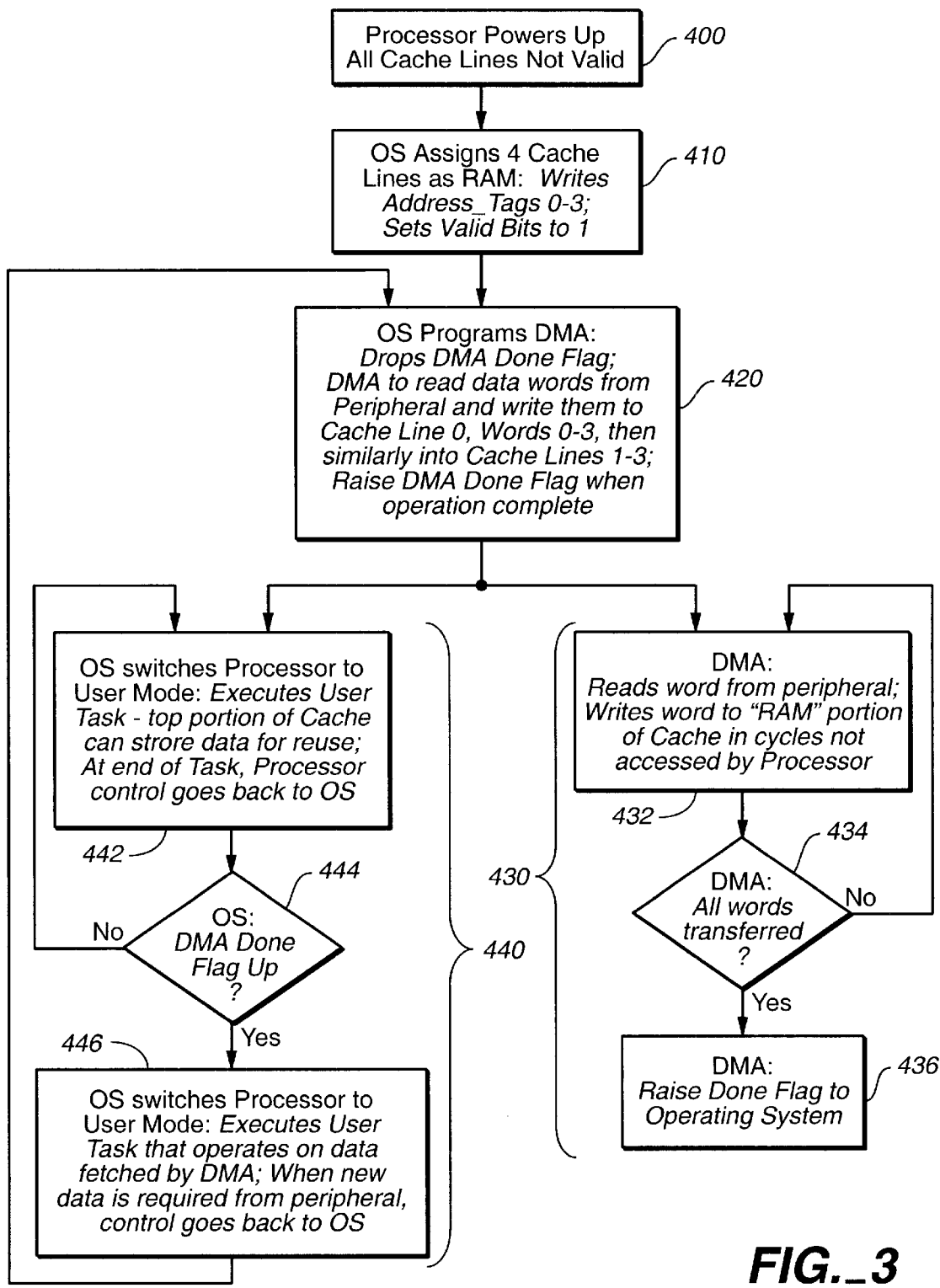
FIG._3

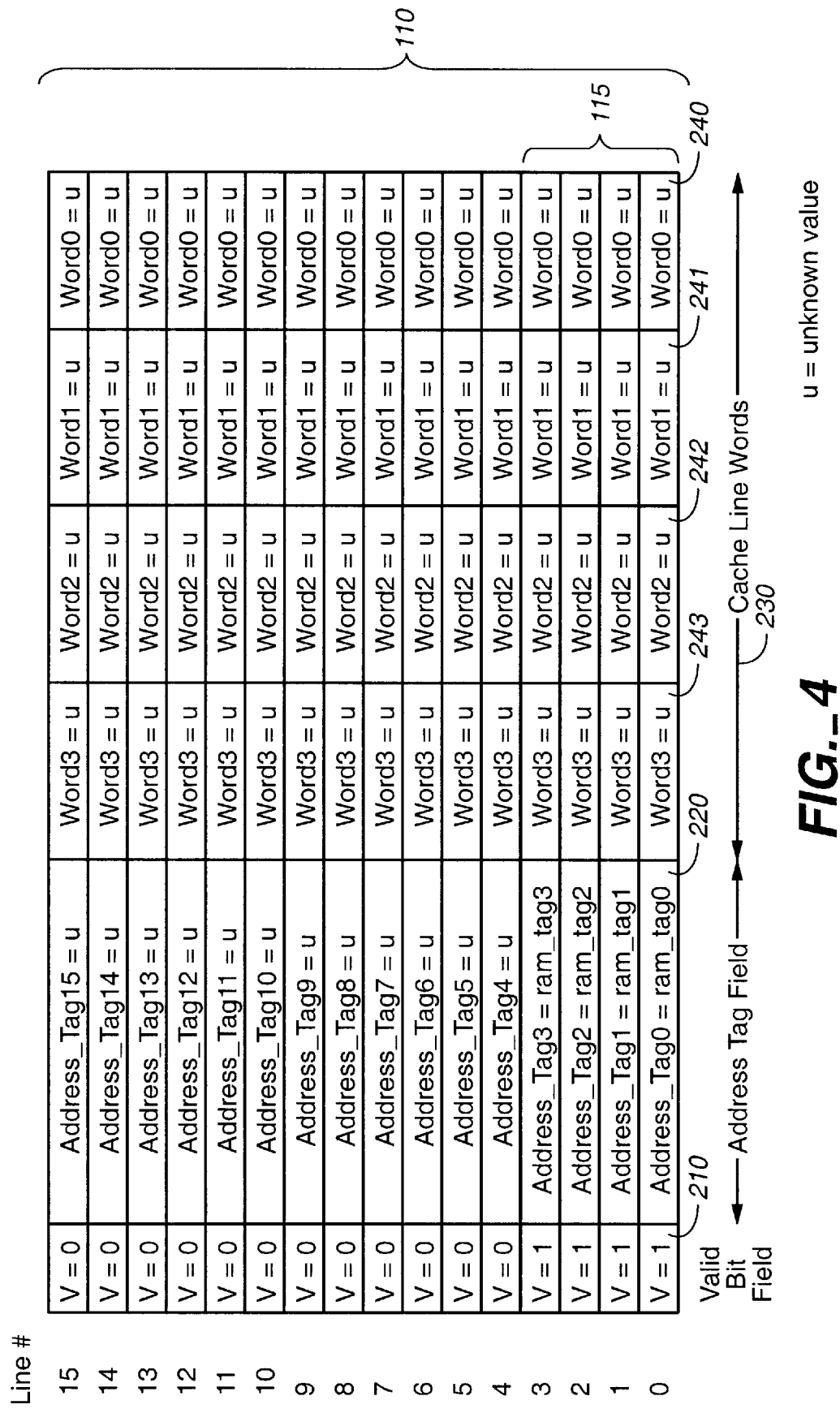
FIG._4

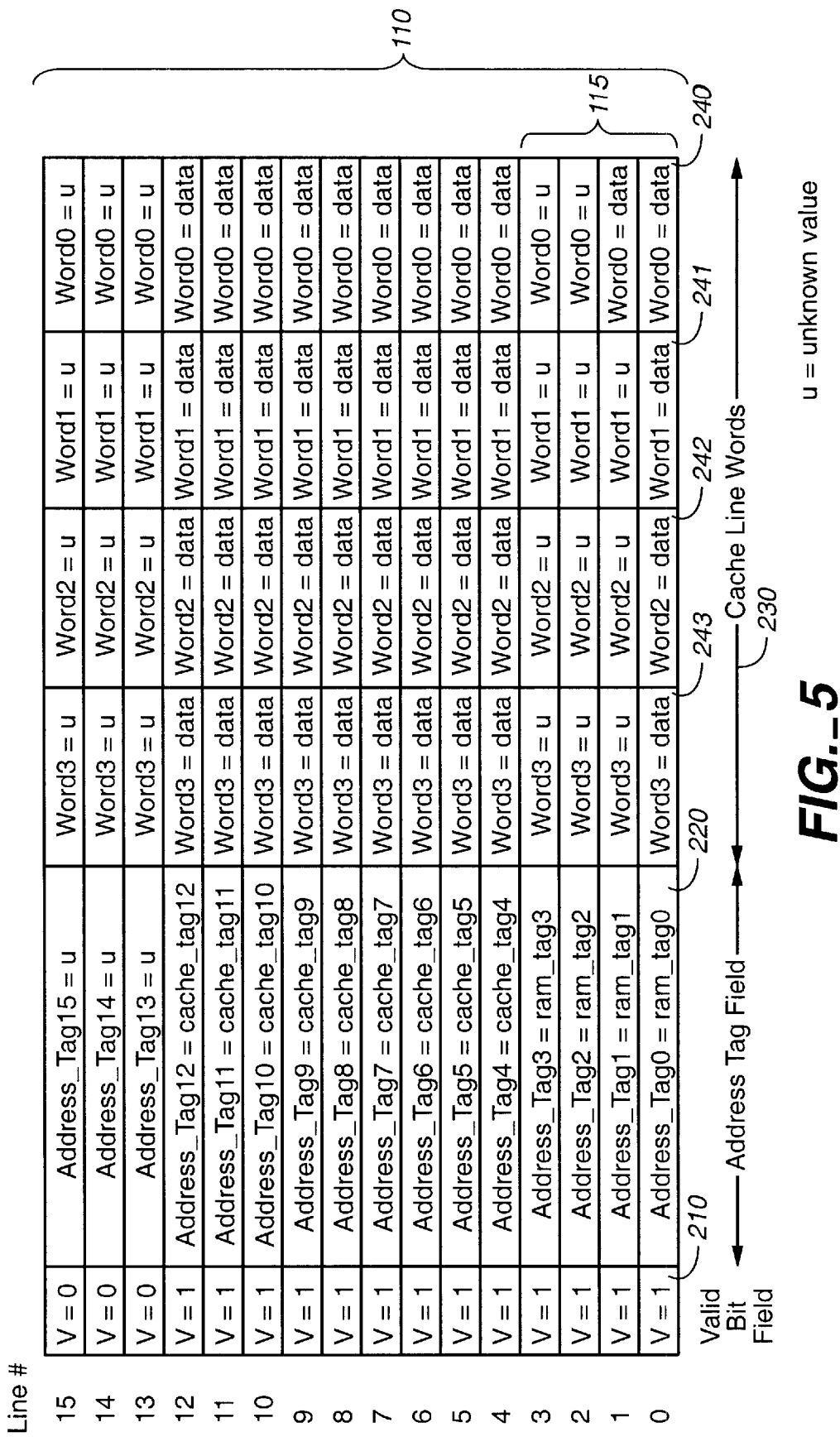
FIG._5

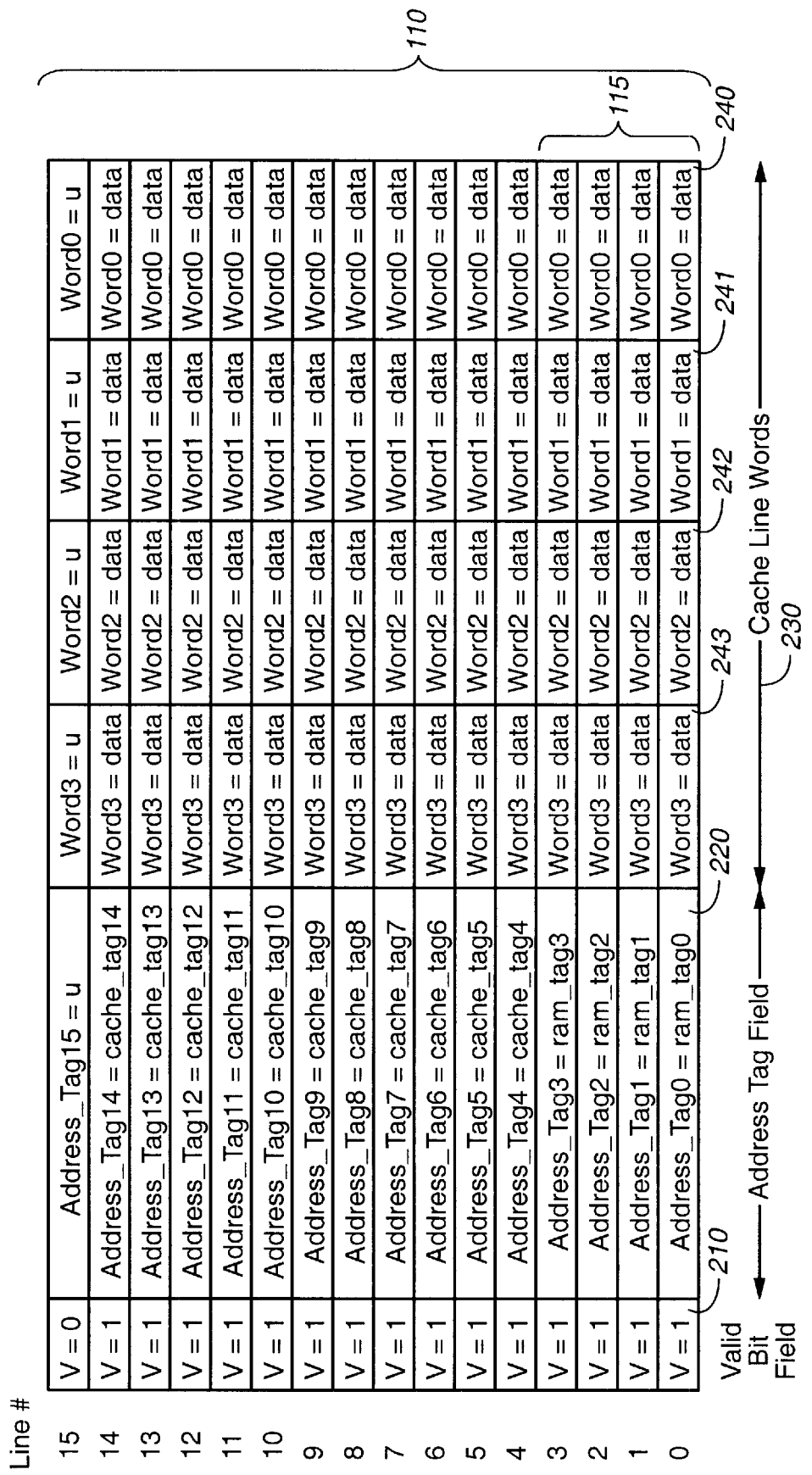
FIG._6

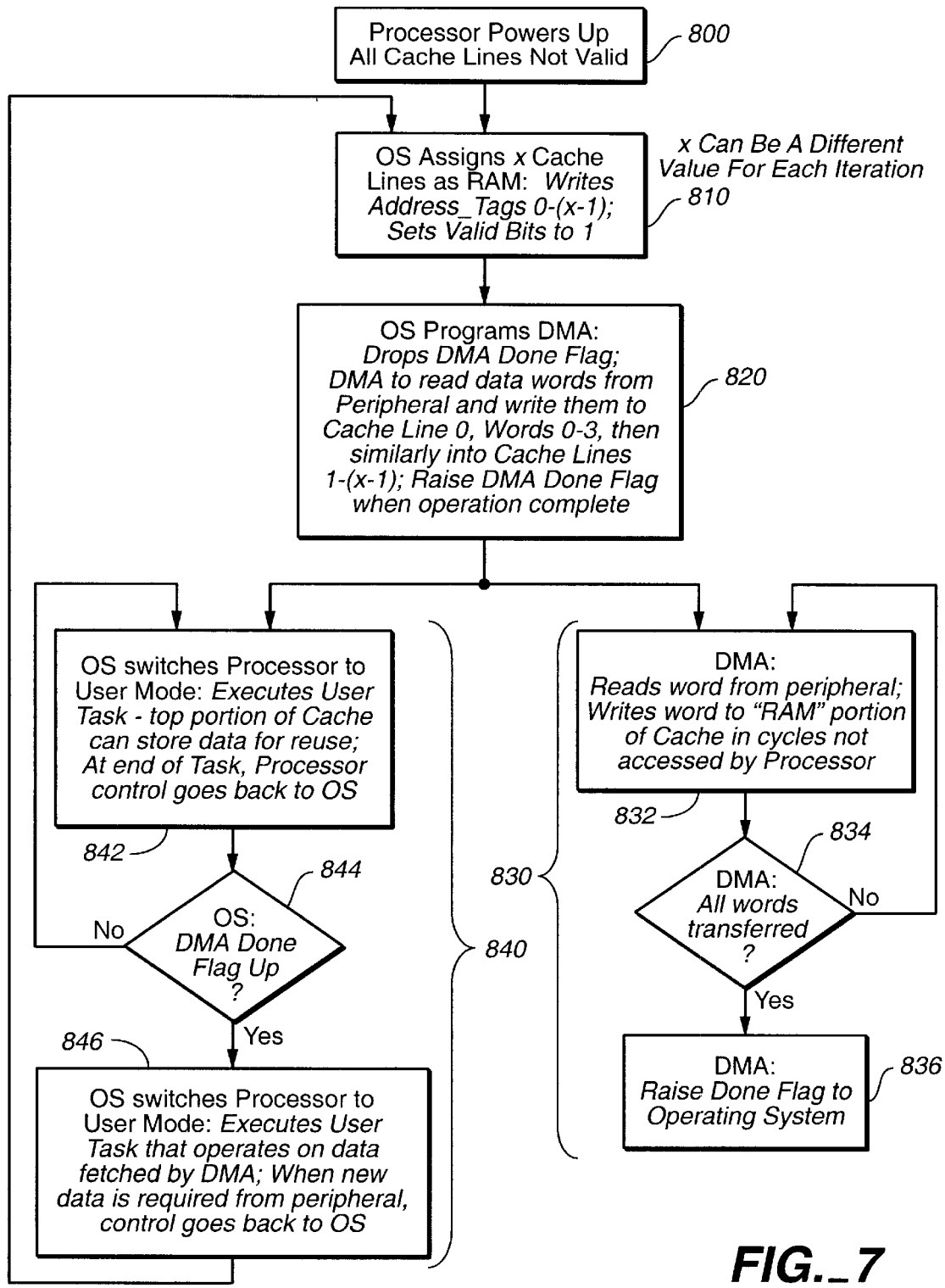
FIG._7

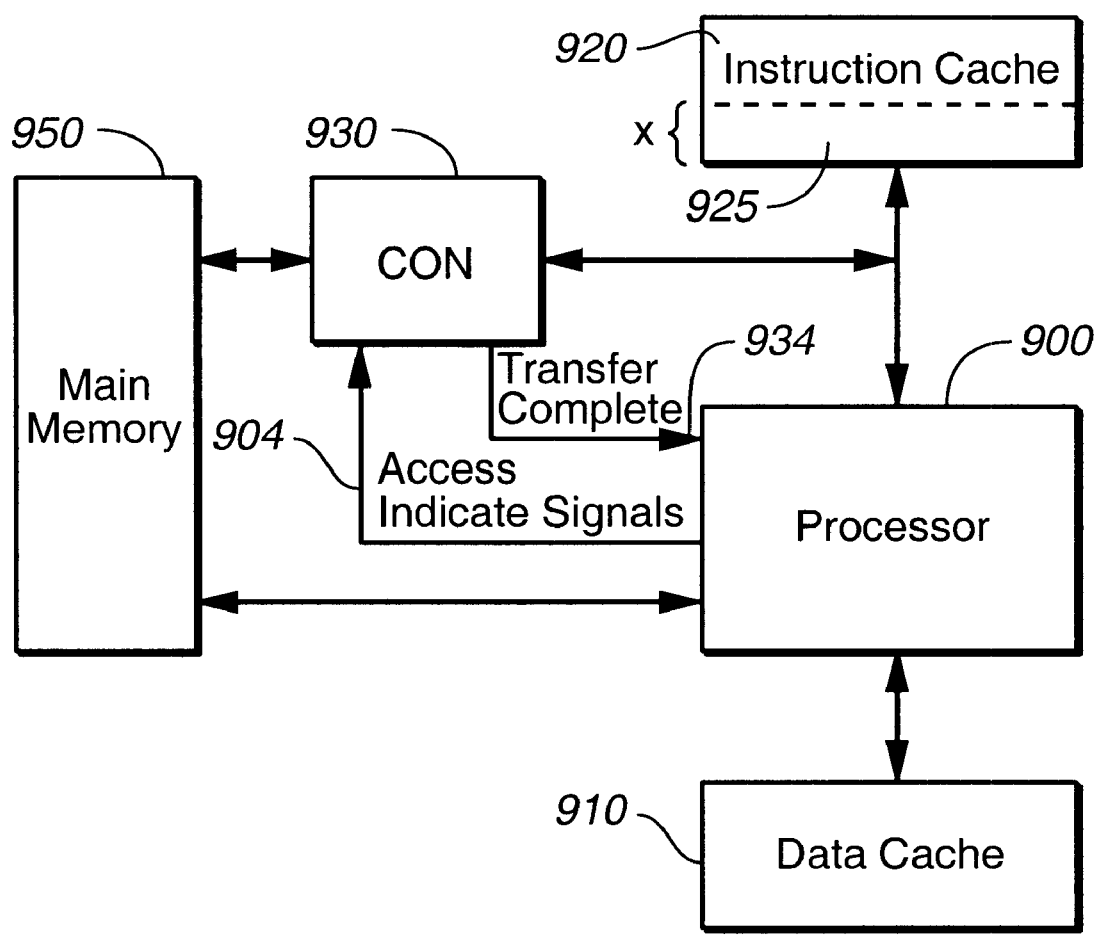
FIG._8

DATA FLOW ENHANCEMENT FOR PROCESSOR ARCHITECTURES WITH CACHE

BACKGROUND OF THE INVENTION

This invention relates to computer systems, and more specifically, to the enhancement of data flow between peripheral devices and the cache of a processor through use of a direct data transfer.

The performance of processor architectures with large memories is generally limited by the slowness of accessing the large memory. To help minimize this limitation, smaller memories know as caches are used. In many common architectures, one cache is dedicated to instructions and another is dedicated to data. As the processor fetches instructions from the larger main memory, for instance, these instructions will be replicated in an instruction cache. In this way, if the processor later uses the same instruction, the processor can fetch this instruction from the cache instead of the main memory, resulting in much faster access times due to the cache's smaller size. As an instruction or small set of instructions are often repeated many times in close proximity, use of an instruction cache can markedly improve performance. In the same way, data caches can enhance processor performance in situations where data is reused.

In the sort of processor architecture described above, peripheral logic blocks are traditionally placed along side the main memory. The processor may then read one or more words from a given peripheral logic block in order to perform computations upon them. When these same words are required for later computations, the processor stores them in the data cache; or if the processor is engaged in a current task, it may read a word or words from a peripheral block and store them in cache for a later computation. In either of these cases, the processor has to perform a "read from peripheral and store into cache" process.

A common technique for increasing the efficiency of data transfer between a peripheral logic block and the main memory is through Direct Memory Access (DMA). In a DMA arrangement, data is transferred directly between the peripheral logic and the main memory under the management of a DMA controller, with the processor removed form the path. In this way, the rate of transfer is no longer limited by the speed of the processor. Additionally, as the processor must no longer directly manage the transfer, supplying only occasional oversight to the DMA controller, it is free to perform other tasks while the transfer takes place.

There are many variations on the DMA technique, but these all supply the data from the peripheral to the main memory. To further move the data to the cache memory requires the processor read the data from the main memory and write it into the cache. For tasks which require a large number of operations upon data coming from a peripheral block, such as streaming audio data for digital signal processing, this required transfer of data from the main memory into cache memory greatly reduces processor efficiency. This problem could overcome if a direct transfer of data could be performed directly between the peripheral logic and the cache, except that such a transfer would undermine the integrity of the cache memory.

The reason for this lies in how the cache is constructed. There are several variations on how to structure a cache, but generically when a processor needs data or a instruction from memory, this information is both copied into the cache and maintained in memory. In this way there is a mapping between each element in the cache memory and an element in the main memory. As the processor operates on an element in, say, the data cache, the result of the operation must also be transmitted back to the corresponding element of the main memory at some time. In order to maintain this correspondence, an entry in the cache will contain not only the actual element, but some way to identify the corresponding address in the main memory and that the cache element is valid. This is true whether discussing an instruction cache, data cache, or unified cache for both instructions and data. Specific examples of how this mapping can be achieved are given below in the discussion of the preferred embodiments. In any case, in order for the processor to function properly, the integrity of the cache must be maintained.

A direct transfer of data between a peripheral logic block and the cache would destroy this integrity as it would break this mapping between the cache element and a memory element. The efficiency of placing the element in the cache would be increased, but as the processor searches for these elements based upon memory address, it could neither properly identify the cache element for which it was searching nor write the element back to a memory location when required.

In this discussion, the term cache is used to mean the standard cache memory of a processor, not a specialized or single purpose structure. In a multilevel cache architecture, this would be the primary or "top-level" cache. There are instances in the prior art, such as U.S. Pat. Nos. 5,261,072, 5,263,142, or U.S. Pat. No. 5,745,707, which perform a DMA-type of transfer to a structured referred to as a "cache", but these are either specialized structures or temporary buffers which subsequently require the data to be written into main memory before it can be sent to the standard cache memory of the processor. As such, they avoid the complications of a direct data transfer between the peripheral logic and this standard cache, but also lack the benefits such an arrangement could provide.

Therefore, although many processor applications, such as the example of streaming audio data given above or the compression and decompression of data, could benefit greatly from being able to transfer data directly between a peripheral logic device and cache memory, this must be done in a way that preserves the integrity of the cache.

SUMMARY OF THE PRESENT INVENTION

The present invention provides for data flow enhancement in processor architectures having one or more caches by allowing DMA-type transfers to and from these caches. Specific examples allow such direct transfers between a peripheral logic device and the cache memory, or between either the main memory or a special memory and the cache memory. This is done by the processor reserving a portion of cache for the direct transfer, which is then carried out by a DMA-type controller. While this transfer is occurring, the processor is able to carry out other tasks and access the unreserved portion of cache in the normal manner. In the preferred embodiment, the transfer is performed by a cycle stealing technique. Once the transfer is complete, the reserved portion of the cache may be accessed by the processor. The size of the reservable portion may either be fixed or dynamically determined by the operating system based on factors such as task flow management and data transfer rates. In a preferred embodiment, the operating system works in concert with the cache organized into cache lines, assigning each cache line an address tag field, with particular values of the address tag indicating that a given cache line is part of the reserved portion of the cache.

BRIEF DESCRIPTION OF THE DRAWINGS

FIG. 1 is a block diagram of an exemplary embodiment of the present invention.

FIG. 2 is an example of cache organization.

FIG. 3 is a flow chart demonstrating the operation of a preferred embodiment where the reservable portion of cache is a fixed size.

FIG. 4 shows a cache organized as in FIG. 2 as it would be disposed after step 410 of FIG. 3.

FIG. 5 shows a cache organized as in FIG. 2 as it would be disposed after step 442 of FIG. 3.

FIG. 6 shows a cache organized as in FIG. 2 as it would be disposed after step 436 of FIG. 3.

FIG. 7 is a flow chart demonstrating the operation of a preferred embodiment where the reservable portion of cache is dynamically determined.

FIG. 8 shows an alternate embodiment of the present invention allowing direct access between the main memory and the cache.

DESCRIPTION OF THE PREFERRED EMBODIMENTS

FIG. 1 is a high level block diagram of one example of the preferred embodiment of the present invention. The architecture of this example shows a separate Instruction Cache 120 and Data Cache 110 with the DMA-type controller CON 130 transferring data to and form cache 110 by way of bus 112. Other examples could additionally, or alternatively, have the controller CON 130 attached to the Instruction Cache 120, while another variation could employ a single, unified cache for both data and instructions. In any of these variations, the cache is the standard cache memory, or primary cache of the processor, not a specific DMA cache, write-back cache, or otherwise specialized cache. For architectures with a multilevel cache structure, the cache shown is that closest to processor, the "uppermost" or "first level" cache corresponding to the main cache. FIG. 1 is used for much of the following discussion as it embodies many of the invention's ideas within a relatively simple geometry that is readily extendable.

Aside from the division into a separate instruction and data caches, which is done since this simplifies the discussion as well as being a common architecture, it needs to be emphasized that the shown cache is the standard, primary cache memory of the processor. In particular, it is neither a dedicated "DMA cache" to act as a buffer during the transfer process nor some other specialized function cache. Although the described invention could be beneficial in such alternate arrangements, the discussion here focuses on the standard cache memory as this is both the most delicate memory, in terms the need to maintain cache coherence, and where the greatest improvement in processor efficiency may be obtained, due to the processor's reliance on accessing this cache at high speed. Similarly, for the sort of multilevel cache architecture mentioned above, the described techniques could be used for any of the cache levels, but the focus here is again on the first level closest to the processor for the same reasons.

As shown in FIG. 1, a Processor 100 is connected to a Main Memory 150 and has both a Data Cache 110 and a separate Instruction Cache 120. A peripheral logic block 140 is connected to a DMA-type controller block CON 130, which is in turn connected to Data cache 110 through bus 112. Note use of name "DMA controller" for block 130 is somewhat misleading as the direct access is not to the memory proper, but to the cache. However, as this terminology is standard for this sort of function, it is used even though it is somewhat misleading in this case. With respect to these blocks, an overview of the process by which the controller block is capable of reading a word from the peripheral logic, and then wait for an appropriate time to write the data word into the data cache, can be described briefly by the following steps.

The processor executes an instruction routine that defines a certain portion, 115, of Data Cache 110 to be associated with specific memory addresses and tag these as containing valid data. The size of this Reserved Portion 115 may either be fixed or variable, as described below. In addition, this Reserved Portion 115 is blocked from being written into by a data cache update sequence similar to that described in the Background section. This is effected by the operating system, which defines the memory needed for the specific tasks the processor will execute and correspondingly assigns memory and cache locations to avoid conflicting overlaps. In essence, a part of Data Cache 110 is removed from its normal function and now acts as fixed address RAM. Processor 100 then programs CON 130 to pass a specific number of data words from Peripheral Logic 140 into this temporary virtual RAM portion 115 of Data Cache 110 when these words become available.

When Peripheral Logic 140 has one or more words available for transfer, it activates its "Data Available" signal 144 to CON 130. When this is received, CON 130 reads one word from Peripheral Logic 140, and then monitors Processor's "Data Cache Access Indicate Signals" 104. These signals indicate whether Processor 100 will access Data Cache 110 on the next clock cycle, and if not, CON 130 writes the word previously read from Peripheral Logic 140 into a particular location of the Reserved Section 115 of the Data Cache. This technique is know as cycle stealing and is preferred here, although a limited burst transfer or other DMA techniques could also be used.

CON 130 repeats reading from Peripheral Logic 140 as long as the "Data Available" signal 144 continues to be active. For each word read in this way, CON 130 continues to write the word into successive locations in the Reserved Portion 115 of Data Cache. Once the specified number of words have been transferred, CON 130 signals to Processor 100 this completion by activating "Transfer Complete" signal 134. Alternately, the processor could determine the status of the transfer process by polling CON 130. Processor 100 can then read these data words to perform the computational task when they are needed. Once the task is complete, the reserved portion of the cache can be returned to part of the standard cache.

Under this arrangement, the processor is relieved from the task of reading data from the peripheral logic and storing them into the data cache for subsequent use or reuse, thereby enhancing performance. Since the controller writes into the cache only during cycles when the cache is not being accessed, no resource conflicts occur that would degrade the processor's performance. Within a particular system implementation, the data cache is designed with a fixed size. The present invention can serve various applications with varying size requirements for both the cache itself and the reservable portion within the cache. Furthermore, the size of the cache and its reserved portion can even be dynamically allocated in a way depending on the tasks to be performed by the processor.

The operation of the present invention will now be given in more detail. To do so, a digression is first given on cache structure. Although the example cache organization described is the preferred embodiment, it is mainly given to make the following discussion more concrete, with the details being readily extendable to other arrangements.

FIG. 2 is a schematic representation of the Data Cache 110 of FIG. 1. The cache is decomposed into N cache line, here N=16 and the lines are numbered 0–15, with cache line 0 indicated by the reference number 200. The Instruction Cache 120 can be decomposed in a similar way, with the number and size of the individual cache lines for either cache being a design choice. The individual cache lines are subdivided into Cache Line Words 230, an Address Tag Field 220, and a Valid Bit Field 210. The Cache Line Words 230 hold the actual data content of the cache and here consists of four words per line, 240–243. Address Tag Field 220 supplies the mapping between the data element contained in the Cache Line Words 230 and their location in the main memory. To supply this mapping, the address tag need not supply the complete address of data in the cache, but only enough of the address to uniquely identify the memory address range of the cache line, here composed of four words. The structure of FIG. 2 is both common and preferred in the present application, although any of the other schemes are known and familiar for organizing the cache and supplying its mapping to the main memory could be used.

At processor power up, all the address tags and words will contains unknown values. This is indicated in FIG. 2 by the value u. Each cache line starts with Valid Bit Field 210 in order that the processor may distinguish between a cache line with valid data and one which has unknown data such as occurs at power up. At power up, therefore, each cache line is assigned a valid bit value V=0, as shown in FIG. 2. Once the processor places actual data into a cache word line and its corresponding tag into the address tag field, the valid bit can then be set to the value V=1. When the processor examines the cache for data, it examines only those cache lines with V=1.

FIG. 2 also indicates the four cache lines 0–3 as the Reserved Portion 115 of Cache 110. The choice of four lines is a choice and other values may either be taken as a fixed number or determined dynamically. As described in general terms above, were CON 130 of FIG. 1 to write data into Cache 110 without the sort of provisions of the present invention, the integrity of the cache would be undermined. This can be seen more clearly with respect to the particular example of cache organization just described: By writing in a word, say Word0 240 of cache line 200, from the peripheral logic, the DMA-type controller will have produced a cache line with a content different from that in the main memory location to which it is mapped by address tag filed 220. In fact, as the data word comes from the peripheral logic and not the main memory, any address tag which is mapped to the main memory would be invalid.

The operating system assigns memory for tasks and needs to insure that the portion of the cache reserved for the DMA-type transfer does not overlap with cacheable main memory. For normal cache operations, including those in the reservable portion of the cache when it is not reserved, the mapping between valid cache lines and the main memory is maintained. When cache lines are reserved, the operating system can either continue to use address tags corresponding to main memory locations or else assign specific address tags indicating the lines as reserved. If the correspondence is maintained, the processor will continue to rely on the cache, not caring about the discrepancy in content. The conflict between the processor and the controller both accessing cache is then avoided by making certain addresses of main memory non-cacheable until the DMA-type transfer is completed. (In some instances, such as when the transferred data is used only one time, there may be no need to make these address cacheable.) In the alternate embodiment described below, the correspondence is no longer maintained and the reserved lines of cache are first given specific fixed tag address indicating their reserved status. The valid bit is then set and the controller loads into the reserved lines under control of the operating system. These lines are non-cacheable until loaded and the operating system changes their status to cacheable.

Of course, cache integrity could be preserved if during the DMA-type transfer process to cache, the processor first wrote each of the transferred elements into the corresponding main memory location before operating upon them. This would thereby maintain the mapping between the cache and the main memory, but, as this requires each of the elements to first be written from cache through the processor into memory, it would therefore be no more efficient than performing a standard DMA process into the main memory and then transferring it from there into cache.

FIG. 3 is a flow diagram for an embodiment where at processor initialization, a fixed number x of cache lines, in this example four, are assigned as the reserved portion of the cache serving as a fixed address RAM block. This assignment is only done once, with the controller repeatedly transferring data into this "RAM" portion of the cache. The remaining (N–x) cache lines remain accessible to the processor in the normal way during the transfer process.

In step 400, the processor powers up. At this point all cache lines are in the state indicated in FIG. 2, with unknown values in both the words and address tags and the validity bits all set to the value of V=0. In step 410, the Operating System (OS) assigns four cache lines to serve as RAM for the direct access transfer. The size of the portion of cache set aside, here four lines, is defined by the operating system as determined by the user according to the use to which the processor will put. For those cache lines reserved for the direct access transfer, the corresponding address tags are written and validity bits are set to V=1.

The result of step 410 is shown in FIG. 4. This shows the cache decomposed into the cache lines of FIG. 2, except that the operating system has written the address tags of the reserved portion 115, again taken to be lines 0–3, to particular values. These are labeled as Address_Tag0–3=ram_tag0–3 to indicate their reserved status as a fixed address RAM block for the transfer, thereby preventing them from being written into by a cache update sequence. In the preferred embodiment, these values of ram_tag0–3 no longer correspond to an actual location in the main memory. In the alternate embodiment noted above, they could still be the same as an actual memory location, as long as the operating system resolved this conflict by designating the contents of that location in memory as being non-cachable. The setting of the validity field 200 to V=1 in these lines correspondingly indicates to the processor that it may access these lines. At this stage, though, the actual words in these lines still contain unknown values as the DMA-type transfer has not yet occurred.

Once the operating system has reserved part of the cache, it programs the controller in step 420. The controller is programmed to pass a specific number of words, based upon the task which the processor wants to perform, from the peripheral logic as they become available. Initially, a "DMA Done" flag is dropped to indicate that the transfer is in process. The controller then reads words from the peripheral logic and writes them in the cache, in this example starting with cache line 0, words 0–3, and progressing on to cache lines 1–3. During this process, the two loops 430 and 440 of FIG. 3 are running at the same time in an independent but coordinated manner.

The loop 440 show the activity of the processor during the transfer between the peripheral logic and the cache. As this transfer is under control of the DMA-type controller, the processor is free to perform other tasks. In step 442, the operating system switches the processor to user mode in order to execute a user task. While performing this task, the processor can use the non-reserved portion of the cache, in this example lines 4–15, in the usual fashion while the controller goes about filling up the reserved portion. FIG. 5 represents the cache at this point.

As shown in FIG. 5, cache lines 4–12 have data stored in them for reuse, their corresponding address tags set and validity bits set to V=1. The uppermost three cache lines are still unused, but available to the processor if needed. In the reserved portion 115 of the cache, the controller has transferred data from the peripheral logic to all the words of cache line 0, but only to the first word of the of the second line at this point. Should the processor finish its task at this point, processor control is returned to the operating system, which then checks the "DMA Done" flag in step 444. As shown in FIG. 5, the transfer is still in process, the "DMA Done" flag is not yet up, and the operating system returns to step 442 to execute another user task while the transfer continues.

Meanwhile, the controller, having been programmed in step 420, is concurrently running loop 430. In step 432, one or more words are passed from the peripheral logic to the reserved portion of the cache, the availability of these being indicated by the "Data Availability" signal 144 of FIG. 1. These words are written into the reserved portion of the cache during cycles when the cache is not accessed by the processor. By monitoring the "Data Cache Access Indicate Signals" 104 of FIG. 1, the controller can tell whether the processor will be accessing the cache on the next cycle. This process continues in a word by word manner until the specified number of words have been transferred. Once this is determined to be the case in step 434, the "DMA Done" flag is raised, corresponding to the "Transfer Complete" signal 134 of FIG. 1. The disposition of the cache at this point is shown in FIG. 6.

FIG. 6 shows the cache after the controller has completed writing all words in the reserved section 115, each of the words of cache lines 0–4 now containing data. Since while this transfer was going on, the processor was executing user tasks, data has been stored in cache lines 4–14 for reuse as part of its current task in step 442. Upon completing this current task, in its next run through step 444 the operating system finds the "DMA Done" flag up and goes to step 446.

It is in step 446 that the processor actually uses the data it has requested from the peripheral logic device. The operating system switches the processor to user mode allowing it execute the user task that operates on the data fetched by the controller from the peripheral logic. Should the processor require new data from the peripheral, it returns control to the operating system, going back to step 420 to again program the controller and close the larger loop.

FIG. 7 is a flow diagram for an embodiment where the operating system dynamically assigns the number of cache lines that form the reserved portion of the cache. It is similar to FIG. 3 and is correspondingly numbered, the major distinctions being in what happens in step 810 and in that step 846 loops back to step 810, not step 820.

In step 800, the processor powers up and, as described with respect to step 400 of FIG. 3, all cache lines are invalid as shown in FIG. 2. In step 810, the operating systems assigns x cache lines to serve as the reserved portion of the cache for direct access. In the previous embodiment of FIG. 3, the value of x was a set value whose size was defined by the operating system in step 410. In that embodiment, the example of x=4 was used as that defined by the operating system in response to the user's determination; although other values could be chosen, this value stayed the same throughout the succeeding steps of FIG. 3. In contrast, in step 810 of FIG. 7 the value of x is dynamically determined by the operating system based on factors such as task flow management and the data transfer rate of the peripheral device. This value of x can be different at each iteration of step 810. At the end of step 810, the cache will look much like that in FIG. 4, although the number of lines forming the reserved portion 115 may differ. In particular, it will look the same as FIG. 4 for a value of x=4—a value which may change at the next iteration of step 810.

Step 820 and cycles 830 and 840 function as previously described in regard to step 420 and cycles 430 and 440 of FIG. 3. FIGS. 5 and 6 again represent an example of the disposition of cache 110 at steps 842 and 836, except that the number of cache lines in the reserved portion is now a value x, which is variable from iteration to iteration and not the fixed value shown as x=4 in these figures.

At the end of step 846, the flow returns to step 810. The reserved portion of the cache is again usable as a standard part of cache until another direct transfer between it and the peripheral logic is needed, at which point the operating system then defines a new and possibly different value for x before going on to step 820 and subsequent steps. This should be compared with FIG. 3, where from step 446, the flow loops back to step 420 without revisiting step 410.

Whether the dynamically assigned embodiment, described with respect to FIG. 7, or the fixed value embodiment, described with respect to FIG. 3, is preferred will depend the particular application, based on considerations such as how the processor will be used and the nature of the peripheral logic device. For a particular application, which is better will vary. Although the dynamically assigned version has greater flexibility, it also requires greater overhead. In situations where the task, the needs of the peripheral device, or both are well understood and show little variation, a fixed value may be more efficient as this flexibility may not be needed and only result in extra work for the operating system.

The discussion of the process in FIGS. 3 and 7 has been mainly in terms of the transfer of data from the peripheral device into the cache memory. As with a conventional DMA arrangement, the present invention can be applied to both sending and receiving processes, with the controller overseeing a direct transfer of data in either direction between the cache and peripheral logic. In a sending function, the Processor 100 writes computed data to the Reserved Portion 115 of Cache 110. As with the receiving function already given in detail, the size of this reserved portion may be either a fixed size or a dynamically assigned embodiment. This Reserved Portion 115 then acts a "RAM" portion of Cache 110 during the transfer, with the controller CON 130 performing DMA-type transfers of the data out to Peripheral Logic 140. An example of this process is where the processor compresses data which is then written into the reserved portion of the cache. This compressed data then could then go to a serial port as the peripheral device.

The discussion given below of various extensions of the present invention will also be given mainly in terms of the receiving function in some cases in order to make the discussion more tractable. As with the embodiments already described, these further embodiments are also for the transfer of data in both directions.

The scheme of this invention can be extended to transfer data to or from a data cache with more than one peripheral logic block and more than one controller may be employed, or to transfer data or instructions between processors in a master/slave arrangement. The scheme can also be used to transfer data between special memory blocks and the data cache, as well as to load instructions from a special memory into the instruction cache, readying for the next task to be performed by the processor.

In particular, FIG. 8 shows an arrangement where the DMA-type controller CON 930 can perform a direct transfer of data between the Main Memory 950 and the instruction cache I-Cache 920, although, as with the arrangement of FIG. 1, this could again instead be connected the data cache D-Cache 910, a unified cache, or one of the more general arrangements discussed there. This is a more unusual scheme than that of FIG. 1, both in that the main memory is in the place of a peripheral device and in that the transfer is of instructions, going into I-Cache 920 by way of its bus, instead of the more usual transfer of data.

Although it may appear a somewhat redundant process, since the processor PROC 900 could make the transfer of, in this example, instructions from the Main Memory 950 to the I-Cache 920 itself, the arrangement of FIG. 8 again has a number of uses. For example, when the processor is performing a current task and will be requiring a block of instructions up a ways, these instructions can be transferred to the instruction cache by the direct access controller so that they are ready when the processor calls for them. This leaves the processor free to continue with its current task while the controller oversees the transfer. The instructions could, for example, stored in a special block of main memory or in a special memory, such as an EEPROM. This would allow a special block of instruction that may required for a particular task to be transfer to the reserved portion of the instruction cache as part of a single direct transfer process.

The actual function of the embodiment of FIG. 8 is analogous to that of FIG. 1 and the various components are correspondingly labeled. The processor PROC 900 will again run an instruction routine to reserve a portion 925 of I-Cache 920 for a DMA-type transfer. The controller CON 930 transfer words from the Main Memory 950 to the reserved portion 925. In the preferred embodiment, this is again done through cycle stealing, with the controller CON 930 monitoring the "Access Indicate Signals" 904 to determine those cycle when the instruction cache will not be accessed. The transfer continues until the specified number of words have been transferred, at which point the "Transfer Complete" signal 934 is sent to the processor PROC 900 to indicate it can now access these instructions. The size of the reserved portion 925 of I-Cache 920 can again be fixed or dynamically assigned, the process being analogous to that described in the flow diagrams of FIGS. 3 and 7, respectively. Instructions can similarly be transferred out of cache, although the need for this is less common, but may occur in the example of self-modifying code where an already modified set of instructions would need to be transferred back to storage.

The ability of the present invention to perform direct transfers between a peripheral and the cache memory are useful in a number of applications. One example mentioned in the Background section is in the streaming of audio data. This could be where a peripheral device is sampling audio data and then digitizing it. The DMA-type controller can then transfer the digitized data into the cache so that the processor can perform digital signal processing, such as reverb, on the signal without having to first extract it from memory, thereby increasing the efficiency of the process. Another example is in the compression of data, a technique finding an ever increasing usage. In this case, the incoming data would consist of non-compressed data written directly into the cache. This could again be audio or, in the case of telephony, voice data which the peripheral has digitized. The processor can then compress the data and store it in the main memory without first having to have stored it there in its uncompressed form. Conversely, compressed data stored in the main memory could be decompressed by the processor and directly transferred from the cache memory to the peripheral, say a digital to analog converter, without the need to have the main memory updated with the decompressed result.

Various details of the implementation and method are merely illustrative of the invention. It will be understood that various changes in such details may be within the scope of the invention, which is to be limited only by the appended claims.

What is claimed is:

1. An apparatus comprising:
   one or more peripheral logic devices;
   a processor;
   a cache for said processor; and
   a controller connected to said cache, said controller and to said one or more peripheral logic devices, wherein when said processor requests a direct transfer of data between said cache and one of said peripheral logic devices, said processor reserves a portion of said cache for said direct transfer of data which is then performed by the controller between said reserved portion and said one of said peripheral logic devices during cycles when the processor indicates during a preceding cycle that it will not access said cache.

2. The apparatus of claim 1, wherein once said direct transfer of data is complete, said reserved portion of said cache memory is no longer so reserved.

3. The apparatus of claim 1, wherein said reserved portion of the cache is less than the entire cache and wherein the processor can access unreserved portions of the cache during the direct data transfer process.

4. The apparatus of claim 3, further comprising a main memory, wherein an element contained in said unreserved portions of the cache is identified with an element in the main memory.

5. The apparatus of claim 4, wherein an element contained in said reserved portion of the cache is identified with an element in the main memory.

6. The apparatus of claim 1, wherein said cache is a data cache.

7. The apparatus of claim 1, wherein said cache is an instruction cache.

8. The apparatus of claim 1, wherein said reserved portion of said cache is of a fixed size.

9. The apparatus of claim 1, wherein the size of said reserved portion of said cache is dynamically determined by the processor.

10. An apparatus comprising:

one or more peripheral logic devices;

a processor;

a cache for said processor; and a controller connected to said cache and to said one or more peripheral logic devices, wherein when said processor requests a direct transfer of data between said cache and one of said peripheral logic devices, said processor reserves a portion of said cache for said direct transfer of data which is then performed by the controller between said reserved portion and said one of said peripheral logic devices, wherein the size of said reserved portion of said cache is dynamically determined by the processor based on the data transfer rate of said one of the peripheral logic devices.

11. An apparatus comprising:

one or more peripheral logic devices;

a processor;

a cache for said processor, wherein said cache is composed of cache lines structured to include a validity field, an address tag field and a data field; and a controller connected to said cache and to said one or more peripheral logic devices, wherein when said processor requests a direct transfer of data between said cache and one of said peripheral logic devices, said processor reserves a portion of said cache for said direct transfer of data which is then performed by the controller between said reserved portion and said one of said peripheral logic devices.

12. The apparatus of claim 11, further comprising a main memory, wherein the address tag field of those cache lines which belong to the reserved portion of said cache are assigned a value that does not correspond to a location in the main memory.

13. An apparatus comprising:

a processor;

a cache for said processor;

a main memory; and a controller connected to the cache and to the main memory, wherein when said processor requests a direct transfer of data between said cache and the main memory, the processor reserves a portion of said cache for said direct memory transfer which is then performed by said controller between said reserved portion and the main memory.

14. The apparatus of claim 13, wherein once said direct transfer of data is complete, said reserved portion of said cache memory is no longer so reserved.

15. An apparatus comprising:

a processor;

a cache for said processor;

a main memory; and a controller connected to the cache and to the main memory, wherein when said processor requests a direct transfer of data between said cache and the main memory, the processor reserves a portion of said cache for said direct memory transfer which is then performed by said controller between said reserved portion and the main memory, wherein said controller performs said direct transfer of data during cycles when the processor indicates during a preceding cycle that it will not access said cache.

16. The apparatus of claim 15, wherein said reserved portion of the cache is less than the entire cache and wherein the processor can access unreserved portions of the cache during the direct data transfer process.

17. The apparatus of claim 15, wherein said cache is a data cache.

18. The apparatus of claim 15, wherein said cache is an instruction cache.

19. The apparatus of claim 15, wherein said reserved portion of said cache is of a fixed size.

20. The apparatus of claim 15, wherein the size of said reserved portion of said cache is dynamically determined by the processor.

21. A method of performing a direct data transfer between the cache of a processor and a peripheral logic by a controller, comprising:

reserving a portion of said cache; and performing a direct data transfer between the peripheral logic and said reserved portion of cache by said controller during cycles when the processor indicates during a preceding cycle that it will not access said cache.

22. The method of claim 21 further comprising:

accessing the reserved portion of the cache by the processor subsequent to performing said direct data transfer.

23. The method of claim 21 further comprising:

returning said reserved portion of said cache to normal cache function subsequent to performing said direct data transfer.

24. The method of claim 23, wherein said reserved portion of the cache is less than the entire cache.

25. The method of claim 24, wherein the processor can access unreserved portions of the cache during the direct data transfer process.

26. The method of claim 21, further comprising:

determining how much of the cache to reserve prior to reserving said portion of the cache, wherein said determining is dynamically determined by said processor.

27. The method of claim 26, wherein the size of said reserved portion of said cache is further determined based on the data transfer rate of said one of the peripheral logic.

28. An apparatus comprising:

a peripheral logic device;

a processor;

a cache for said processor, wherein a portion of said cache is reservable, the contents of said portion not being accessible by said processor when so reserved; and a controller connected to said cache and to said peripheral logic device, wherein said controller performs a DMA-type transfer between said peripheral logic and said reservable portion of said cache in response to said processor when said reservable portion of said cache is reserved and wherein said controller performs said direct transfer of data during cycles when the processor indicates during a preceding cycle that it will not access said cache.

29. The apparatus of claim 28, wherein said reserved portion of the cache is less than the entire cache and wherein the processor can access unreserved portions of the cache during the direct data transfer process.

30. The apparatus of claim 28, wherein the size of said reserved portion of said cache is dynamically determined by the processor.

31. An apparatus comprising:
- a processor;
- a cache for said processor;
- a peripheral logic device; and
- a controller, wherein said controller is connected to perform a DMA-type direct transfer between said cache and said peripheral logic device in response to said processor during cycles when the processor indicates during a preceding cycle that it will not access said cache.

32. The apparatus of claim 31, wherein said processor can access said cache during the DMA-type direct transfer.

33. A method of performing a direct transfer of data between the cache of a processor and a peripheral logic device by a controller, comprising:
- reserving a portion of said cache;
- during a current cycle, determining whether the processor will access the cache during the subsequent cycle;
- during the subsequent cycle, transferring a portion of the data between the peripheral logic and said reserved portion of cache if the processor is not accessing the cache; and
- repeating said determining and transferring until the transfer of said date is complete.

34. The method of claim 33, wherein said determining comprises the processor sending a signal to the controller during the current cycle.

35. The method of claim 33, further comprising:
- sending an indication from the controller to the processor when the transfer is complete.

36. The method of claim 35, further comprising:
- returning said reserved portion of said cache to normal cache function in response to the indication that the transfer is complete.

37. The method of claim 33, wherein said reserved portion of the cache is less than the entire cache.

38. The method of claim 33, further comprising:
- determining how much of the cache to reserve prior to reserving said portion of the cache, wherein said determining is dynamically determined by said processor.

39. The method of claim 38, wherein the size of said reserved portion of said cache is further determined based on the data transfer rate of said one of the peripheral logic.

* * * * *